United States Patent [19]

Owston

[11] 3,725,504

[45] Apr. 3, 1973

[54] FAST CURING POLYCHLOROPRENE ACRYLIC ADHESIVE

[75] Inventor: William J. Owston, Edinboro, Pa.

[73] Assignee: Lord Corporation, Erie, Pa.

[22] Filed: Dec. 30, 1970

[21] Appl. No.: 102,884

[52] U.S. Cl.............260/876 R, 156/327, 156/333, 161/203, 161/217, 161/247, 161/253, 260/45.95, 260/879, 260/885
[51] Int. Cl..........................C08f 15/00, C08f 19/00
[58] Field of Search..................................260/876 R

[56] References Cited

UNITED STATES PATENTS

| | | | |
|---|---|---|---|
| 3,333,025 | 7/1967 | Bader | 260/880 |
| 3,300,545 | 1/1967 | Baer | 260/880 |
| 3,449,471 | 6/1969 | Weitzel | 260/880 |

FOREIGN PATENTS OR APPLICATIONS

| | | | |
|---|---|---|---|
| 1,124,325 | 8/1968 | Great Britain | 260/876 R |
| 6,615,290 | 5/1967 | Netherlands | 260/876 R |

Primary Examiner—Paul Lieberman
Attorney—Howson and Howson

[57] ABSTRACT

An adhesive composition capable of curing in a matter of minutes in the presence of free radical vinyl polymerization catalysis consisting essentially of: A, from about 10 to about 52 percent, by weight, of a syrupy copolymer of polychloroprene, methylmethacrylate and styrene; B, from about 7 to below about 15 percent of methacrylic acid; and C, from about 40 to about 83 percent of a solution of an acrylate polymer in methylmethacrylate.

12 Claims, No Drawings

3,725,504

FAST CURING POLYCHLOROPRENE ACRYLIC ADHESIVE

BACKGROUND OF THE INVENTION

U.S. Pat. No. 3,333,025 relates to adhesive compositions comprising a syrupy copolymer of polychloroprene, methylmethacrylate and styrene; that is a polymerizable mixture of polymethylmethacrylate, polystyrene and polychloroprene in methylmethacrylate and styrene such mixture being a partial polymerization product of methylmethacrylate and styrene in the presence of the polychloroprene. The patent also suggests the addition of up to 5 percent, by weight, of unsaturated carboxylic acids, preferably acrylic acid, and up to 40 percent of monomeric acrylic or methacrylic acid esters, preferably methylmethacrylate or polymers of such esters. The composition can be cured through the agency of free radical vinyl polymerization catalysis. Compositions based on this patent are excellent adhesives for bonding many materials. The lapse of time between forming the final curable adhesive (after mixing in the free radical-generating catalyst) and the point where the assembly bearing the adhesive can be readily handled without movement of the joined parts, that is to say where the joined parts cannot be moved relative to each other at the bond line, (referred to herein as the "cure time") is not as short as desired. Thus, commercial adhesives made according to the teachings of the patent have a cure time on the order of a half hour or even an hour. Many applications require much shorter cure times. After the required time to apply the adhesive and join the parts, a further undesirable waiting period exists in many instances before the bonded assembly can be moved or stressed. The problem is aggravated if many parts are to be bonded in series with limited labor or machine resources. Adhesives having long curing times at room temperature require either the use of ovens or considerable area for storage of cemented parts as well as equipment to hold the parts together during the curing reaction. In addition, these relatively long cure times produce undesirable effects in various synthetic materials if used to bond them since the monomers tend to penetrate into organic substrates given sufficient time. Weakening of the substrate through complete or partial dissolution, or by cracking or crazing, can occur. Also, substances, such as plasticizers, processing aids, etc., can be extracted from the substrate and then migrate into the curing adhesive, preventing the adhesive layer from developing its optimum strength.

It is, therefore, a principal object of the present invention to provide novel acrylic adhesive compositions having much shorter cure times than heretofore available with prior acrylic adhesive compositions without sacrificing adhesive bonding qualities.

SUMMARY OF THE INVENTION

The adhesive composition of the present invention consists essentially of: A, a polymerizable mixture of polymethylmethacrylate, polystyrene and polychloroprene in monomeric methylmethacrylate and styrene such polymerizable mixture being in the form of a partial polymerization product of methylmethacrylate and styrene in the presence of said polychloroprene, the latter present in an amount from about 1 to about 25 percent, by weight, the balance essentially methylmethacrylate and styrene with the methylmethacrylate predominating; B, methacrylic acid, and C, a syrupy solution of an acrylate polymer in monomeric methylmethacrylate; the relative proportions of A, B and C being from about 10 to about 52 percent, by weight, of A, from about 7 to below about 15 percent of B and from about 40 to about 83 percent of C.

The above-described composition is stable on storage in a container for up to a year or more at room temperature. Accelerated storage — or shelf life tests have shown that the composition is also stable for at least 180 days at elevated temperatures of 110°F. Nevertheless, in the presence of free radical vinyl polymerization catalysis, as by the addition of free radical generating catalysts or by subjecting the composition to gamma radiation, the adhesive cures to where a bonded assembly containing it can be readily handled without relative movement of the bonded parts and consequent disturbing of the bond line in less than 15 minutes at room temperature. This time period between the onset of catalysis and handleable cure is referred to herein as "cure time." Preferred compositions according to the present invention have cure times ranging from about 5 to about 10 minutes at room temperature. Heat accelerates curing so that cure times are even shorter at elevated temperatures.

The shorter cure time is accounted for principally by the presence of methacrylic acid, component B, in the stated amounts. Proportions of methacrylic acid below about 7 percent, by weight, based on the combined weights of A, B and C, do not provide the short cure times. At proportions of about 15 percent and higher, the bond strength begins to decrease markedly and the cured adhesive has increased brittleness and is more sensitive to impact shock. Preferably, the proportion of methacrylic acid is from about 8 to about 12 percent.

Component A, as stated, is a polymerizable mixture to polymethylmethacrylate, polystyrene and polychloroprene in monomeric methylmethacrylate and styrene which has been prepared by partially polymerizing methylmethacrylate and styrene in the presence of polychloroprene (the polychloroprene being present in an amount from about 1 to about 25 percent, preferably from about 12 to about 20 percent, by weight, based on the weight of the three materials, with the balance being methylmethacrylate and styrene, the methylmethacrylate predominating). The mixture is partially polymerized to a viscosity of at least about 500 cp. at 20°C. Some grafting of the methylmethacrylate-styrene polymers onto the neoprene occurs. The resulting material is in the form of a syrup (even a very stiff syrup) in which the polymeric material is dissolved in remaining monomer.

In carrying out the partial polymerization in preparing component A, to the mixture of polychloroprene, methylmethacrylate and styrene, preferably heated to a temperature of about 75°–85°C., is added a free radical forming catalyst. Catalysts include azo compounds, like azobisisobutyronitrile, and peroxides, like benzoyl peroxide and lauroyl peroxide. The amount of catalyst added is such that it will be completely consumed when the desired viscosity is reached. The preparation of component A is described in U.S. Pat. No. 3,333,025;

although it will be noted the material used as component A according to the present invention generally contains a higher proportion of polychloroprene than those of the patent. This higher proportion of polychloroprene compensates for the reduction of impact strength of the cured adhesive by the high proportion of acrylate polymer solution (component C) in the present composition. The proportions of component A in the present composition ranges from about 10 to about 52 percent, preferably from about 15 to about 50 percent, by weight, based on the combined weights of A, B and C. In connection with the foregoing, as a general rule as the proportion of component A in the present composition decreases within the stated range, the proportion of polychloroprene in component A increases.

The third principal constituent of the present composition is component C which is a syrupy solution of an acrylate polymer in methylmethacrylate. This imparts storage stability to the present composition which would otherwise be impaired because of the presence of the methacrylic acid. Preferably the acrylate polymer has a second order glass transition point about 150°C. and exhibits good compatibility with component A. The acrylate polymer may be essentially of a lower alkyl ester of acrylic or methacrylic acid, like methylacrylate, ethylacrylate, butylacrylate, methylmethacrylate and butylmethacrylate and mixtures or copolymers thereof. Polymethylmethacrylate is preferred. As stated, in component C, the acrylate polymer is dissolved in methylmethacrylate to form a syrupy solution. The concentration of acrylate copolymer in component C may range from about 15 up to about 60 percent, by weight, when the material is handled at an elevated temperature, and generally not over about 50 percent if handled at room temperature or lower. The preferred concentration of acrylate polymer in component C is from about 30 to about 50 percent, by weight. The proportion of component C in the present composition ranges from about 40 to about 83 percent, preferably from about 42 to about 75 percent, by weight, based on the combined weight of A, B and C. To the extent the acrylate polymer is present in the compositions of the invention, it reduces the amount of monomer that must be reacted to reach a cured state and thus contributes to the short cure time.

In preparing the composition of the present invention the three components, A, B and C, are merely mixed. This is conveniently done at room temperature, although heating may be resorted to facilitate handling, as where the concentration of acrylate polymer in component C is high.

Reference is made herein to the present composition consisting essentially of components A, B and C. This does not exclude the inclusion of other materials which do not materially alter the advantageous characteristics of the composition. For example, in component C a small amount of hydroxylethylmethacrylate may be used along with the methylmethacrylate as monomer solvent. In the acrylate polymer of component C a small amount of another copolymerizable ethylenically unsaturated material, like vinyl chloride, may be included. Likewise, a small amount of acrylic acid may be substituted for a like proportion of methacrylic acid in component B. It is also desirable for optimum storage life to include a polymerization inhibitor or stabilizer, usually of the quinone type like hydroquinone, methylhydroquinone, toluhydroquinone and 3,5-dihydroxy-2,4-dichloro-p-benzoquinone. Fillers and pigments may be included.

To cure the composition, catalysis is required, and, in general, any free radical source capable of effecting polymerization of ethylenically unsaturated (i.e., vinyl type) monomers. This may be gamma radiation applied to the adhesive at the bond line after application to the parts to be bonded. Preferably, however, a catalyst or catalyst system is added to the composition just prior to use. U. S. Pat. No. 3,333,025 discloses several curing catalyst systems which may be used with the compositions of the present invention depending upon whether room temperature or elevated temperature-curing is to be practiced. For example, the catalyst may be a sulfinic acid, azo compound or a-aminosulfone referred to in U. S. Pat. No. 3,333,025 as substance "D," or a peroxide, which effect polymerization only after heating. Or a multicomponent catalyst effective at room temperature may be used, and examples of these are described in connection with substance "E" supplemented with, e.g., peroxide, in U. S. Pat. No. 3,333,025. A preferred catalyst is a multicomponent redox system based on a tertiary amine, especially one containing an aromatic radical like diisopropanol-p-toluidine, diethanol-p-toluidine, dimethyl aniline and dimethyl-p-toluidine, and a peroxide, like benzoyl peroxide. In this case the tertiary amine may be combined with the basic components of the composition prior to storage and shipment and the peroxide added later at the time of use. When a tertiary amine-containing system is used, it is preferred to include an antioxidant such as trimethyltris (di-t-butyl-4-hydroxylbenzyl) benzene to inhibit oxidation of the amine.

The adhesive of the present invention may be used to bond a wide variety of substrates including metals, synthetic plastics and other polymers, glass, ceramics, wood, and the like. The adhesive is applied to one or both of the surfaces to be joined, and the assembly permitted to stand, with heating where desirable. As stated, one of the principal features of the present adhesive is that, within a relatively brief period after application of the adhesive and joining of the parts to be bonded, the bonded assembly can be handled.

The invention will be more readily understood from consideration of the following examples which are given for the purpose of illustration only and are not to be considered as limiting the scope of the invention in any way:

EXAMPLE 1

Eighteen parts, by weight, of polychloroprene (neoprene WRT) are dissolved in 76 parts of methylmethacrylate and 6 parts of styrene. The mixture is heated to 80° C. after which 0.01 percent of azobisisobutyronitrile is added and the material partially polymerizes to a viscosity of about 170,000 cps. to form component A.

Component B is methacrylic acid.

Component C is a 38 percent solution of polymethylmethacrylate is methylmethacrylate.

A mixture is made from the following:

Parts By Weight

| | |
|---|---|
| Component A | 40 |
| Component B | 9 |
| Component C | 49 |
| Diisopropanol-p-toluidine | 1.5 |
| Toluhydroquinone | 0.03 |

A portion of this composition was sealed in containers and was found to have a useful storage life of at least a year at room temperature and of at least 180 days at 110° F.

With the remainder of the composition was mixed 3 percent of a 50 percent benzoyl peroxide paste in dibutyl phthalate and the resulting material was used to bond various substrates. In the bonding tests two strips of the particular substrate are bonded together by means of the adhesive, in the form of a lap joint. The assemblies were then allowed to stand for 24 hours at room temperature after which the tensile shear strength of the bonds was determined. The results were as follows:

| Substrate | Bond Strength (psi) |
|---|---|
| Grit-blasted cold rolled steel | 3400 |
| Acid-etched aluminum | 3500 |
| Sanded, high profile FRP* | 1050** |

\* Fiber glass reinforced polyester plastic, which before sanding shows fiber ridges on surface from shrinkage during curing.
\*\* Failure (fracture) in substrate.

It was found that the elapsed time from mixing the benzoyl peroxide catalyst with the adhesive composition to the point where the bonded assemblies were rigid and handleable, ("cure time") was only 8 minutes.

By way of comparison a composition is prepared by mixing the following:

| | Parts, by weight |
|---|---|
| Component A | 55 |
| Component B | 5 |
| Component C | 40 |
| Diisopropanol-p-toluidine | 3.0 |
| Toluhydroquinone | 0.01 |

Its shelf life was about 1 month at room temperature, and its cure time, after mixing in 3 percent of the benzoyl peroxide catalyst paste, was 22–25 minutes at room temperature.

EXAMPLE 2

The composition of this example is similar to that of Example 1 except that 45 parts of component A and 44 parts of component C are used.

The composition has a storage life of at least a year at room temperature, and a cure time, after addition of benzoyl peroxide catalyst, of 10 minutes at room temperature.

The bond strength (tensile shear) of an acid-etched aluminum assembly bonded with this adhesive is 2,700 psi.

EXAMPLES 3 and 4

Compositions are prepared as in Example 1 using components A, B, and C thereof, as follows:

| | Ex. 3 | Ex. 4 |
|---|---|---|
| | Parts, by weight | |
| Component A | 25 | 35 |
| Component B | 9 | 9 |
| Component C | 64 | 54 |
| Diisopropanol-p-toluidine | 2 | 2 |
| Toluhydroquinone | 0.005 | 0.005 |
| Trimethyltris (di-t-butyl-4-hydroxybenzyl) benzene | 0.01 | 0.01 |

After mixing 3 percent of a 50 percent benzoyl peroxide paste with the composition acid-etched aluminum strips and acid-etched aluminum blocks were bonded. The cure time, at room temperature, was determined. The tensile shear strength of the bonded strips was measured. The impact strength of the bonded blocks was measured on an Izod type tester. The results are as follows (bond strength having been measured after 24 hours at room temperature):

| | Ex. 3 | Ex. 4 |
|---|---|---|
| Cure time (min.) | 8 | 10 |
| Tensile shear (psi) | 5000 | 5300 |
| Impact (ft. lbs./in.$^2$) | 2 | 1.5 |

EXAMPLE 5

In this example components A and B are the same as in Example 1. Component C, however, is a 48 percent solution, in methylmethacrylate, of a thermoplastic interpolymer of methylmethacrylate and ethylacrylate in which interpolymer the methylmethacrylate predominates ("Acryloid B–44" of Rohm and Haas Company).

A mixture is prepared from the following:

| | Parts, by weight |
|---|---|
| Component A | 40 |
| Component B | 9 |
| Component C | 49 |
| Paraffin (melt index 46–54° C.) | 0.3 |
| Dichloro, dihydroxy-p-benzoquinone | 0.01 |
| Diisopropanol-p-toluidine | 1.5 |

The cure time of this adhesive, after adding the benzoyl peroxide paste catalyst, was 11 minutes, and bond strengths were comparable to those for the adhesive of Example 1.

EXAMPLE 6

A composition is prepared as in Example 5 except that 15 parts of Component B (methacrylic acid) are used and component C is the same as in Example 1, 43 parts being used.

The cure time was 7 minutes. However, the bond strength is about half that provided by the adhesive of Example 1 and has greater embrittlement and shock sensitivity. It is for these reasons that component B, according to the present invention, is maintained below 15 percent and preferably not over about 12 percent.

EXAMPLES 7 and 8

Compositions are prepared as in Example 6 using, however, for Example 7, 53 parts of Component C and, in place of Component B (methacrylic acid), 5 parts of acrylic acid; and, for Example 8, 49 parts of Component C, and in place of Component B (methacrylic acid), 9 parts of acrylic acid.

The cure times, after addition of the benzoyl peroxide curing catalyst, were 23 minutes for Example 7 and 19 minutes for Example 8. The bond strengths for the composition of Examples 7 and 8 were about 25 percent and about 37 percent, respectively, of that provided by a control similar to the composition of Example 1.

What is claimed is:

1. An adhesive composition consisting essentially of: A, a polymerizable mixture of polymethylmethacrylate, polystyrene and polychloroprene in monomeric methylmethacrylate and styrene, said polymerizable mixture being in the form of a partial polymerization product of methylmethacrylate and styrene in the presence of said polychloroprene and wherein said polychloroprene is present in an amount from about 1 to about 25 percent, by weight, the balance being essentially methylmethacrylate and styrene with the methylmethacrylate predominating; B, methacrylic acid; and C, a syrupy solution of an acrylate polymer in methylmethacrylate wherein the acrylate polymer is present in an amount from about 15 to 60 percent by weight of said solution; the relative proportions of A, B, and C being from about 10 to about 52 percent by weight of A, from about 7 to below about 15 percent of B and from about 40 to about 83 percent of C.

2. The composition of claim 1 wherein the polychloroprene in component A is present in an amount from about 12 to about 20 percent.

3. The composition of claim 1 wherein the relative proportions of A, B and C are from about 15 to about 50 percent of A, from about 8 to about 12 percent of B and from about 42 to about 75 percent of C.

4. The composition of claim 3 wherein the polychloroprene in component A is present in an amount from about 12 to about 20 percent.

5. The composition of claim 1 wherein the acrylate polymer in component C is polymethylmethacrylate.

6. The composition of claim 5 wherein the polychloroprene in component A is present in an amount from about 12 to about 20 percent.

7. The composition of claim 5 wherein the relative proportions of A, B and C are from about 15 to about 50 percent of A, from about 8 to about 12 percent of B and from about 42 to about 75 percent of C.

8. The composition of claim 7 wherein the polychloroprene in component A is present in an amount from about 12 to about 20 percent.

9. The composition of claim 1 wherein said acrylate polymer comprises an interpolymer of methylmethacrylate and ethylacralate.

10. The composition of claim 9 wherein the polychloroprene in component A is present in an amount from about 12 to about 20 percent.

11. The composition of claim 9 wherein the relative proportions of A, B and C are from about 15 to about 50 percent of A, from about 8 to about 12 percent of B and from about 42 to about 75 percent of C.

12. The composition of claim 11 wherein the polychloroprene in component A is present in an amount from about 12 to about 20 percent.

* * * * *